UNITED STATES PATENT OFFICE.

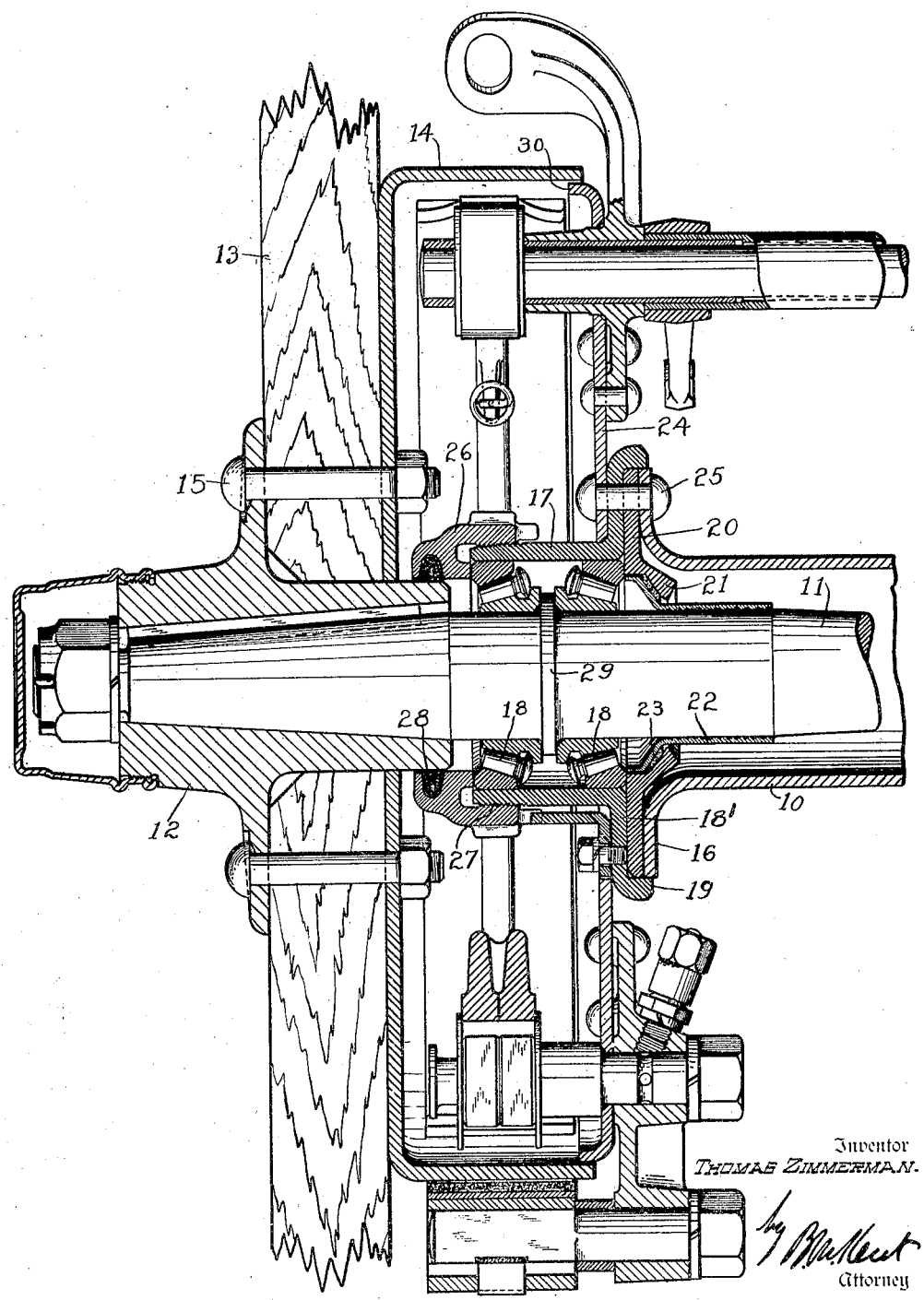

THOMAS ZIMMERMAN, OF CLEVELAND, OHIO, ASSIGNOR TO THE STANDARD PARTS COMPANY, OF CLEVELAND, OHIO, A CORPORATION OF OHIO.

AXLE.

1,422,647.      Specification of Letters Patent.      Patented July 11, 1922.

Application filed June 14, 1919. Serial No. 304,123.

*To all whom it may concern:*

Be it known that I, THOMAS ZIMMERMAN, a citizen of the United States, and a resident of Cleveland, county of Cuyahoga, State of Ohio, have invented certain new and useful Improvements in Axles, of which the following is a specification.

This invention relates to motor vehicle axles and more particularly to the end construction for supporting the bearings and the brake anchorage.

One of the objects of the invention is to provide a construction especially adapted for pressed steel housings, whereby the bearings and brakes will be thoroughly housed and supported, the parts being designed for economical production on a commercial scale.

Other objects and the features of novelty will be apparent from the following description, taken in connection with the accompanying drawing, which is a section on the axis of an axle, embodying the invention.

Referring to the drawing, 10 indicates the end of an axle housing and 11 the end of the driving shaft therein. It will be understood that the construction of the opposite end of the axle housing will be the same as illustrated and, therefore, a description of but one end is necessary. The shaft 11 has a wheel hub 12 mounted thereon, in any approved manner, and the wheel hub carries the spokes 13 and the brake drum 14, which parts are secured to the hub by the bolts 15, or in any other suitable manner. The end of the housing 10 is provided with a flange 16 and carries a tubular extension 17 for the roller bearings 18 which support the housing 10 on the shaft 11. The extension 17 has a flange 18' and on the periphery of this flange, there is an axially extending flange 19, the interior of which fits over the periphery of the flange 16 on the housing. Between the flanges 16 and 18', there may be arranged a diaphragm or disc 20, which is formed with a cone 21 at the center to cooperate with a sleeve 22 on the shaft 11, for the purpose of confining lubricant in the chamber for the bearings 18. Suitable packing 23 may be provided between the parts 21 and 22.

A brake anchor disc 24 is mounted upon the housing extension 17 in abutting relation to the flange 18', and the disc 24, the flanges 16 and 18' and the disc 20 are all secured together by means of rivets 25, or in any other suitable manner.

The disc 20 forms an interior abutment for one of the bearings 18, the other bearing being engaged by a nut 26 which has threaded engagement with the exterior of extension 17, as indicated at 27. The nut 26 may be arranged to surround the hub 12 and carry a packing 28 which cooperates with the outer surface of the hub to retain lubricant in the chamber for the bearings 18. The bearings 18 are arranged on opposite sides of a collar 29 on the shaft 11 and are held between the disc 20 and the nut 26, this arrangement holding the shaft 11 against axial movement relative to the axle housing.

The detail construction of the brakes which cooperate with the drum 14 does not enter into the present invention and a description thereof is omitted. The disc 24, however, is preferably provided with an axially extending flange 30 which enters the drum 14 and serves to exclude dust and water from the brakes.

The provision of the flange 19 on the extension 17 insures accurate alinement of the extension with the axle housing and also strengthens the structure by transmitting the load directly from the housing 10 to the extension 17 and without subjecting the rivets 25 to undue stress. The extension 17 may be stamped-up from a piece of flat stock and is thus adapted for economical manufacture.

Having thus described my invention, what I claim is:

1. In axle construction, the combination of an axle housing having an integral radial flange at the end, an extension having a radial flange and an axially extending flange surrounding said housing flange, a brake anchor member mounted upon said extension in abutting relation to one of said radial flanges, and means for securing said member and said radial flanges together.

2. In axle construction, the combination of an axle housing having an integral flange at the end thereof, a tubular extension for said housing having a radial flange, a disc arranged between said flanges extending into said housing to form an abutment, and a brake anchor member on said extension, said disc, said member and said flanges being all secured together.

In testimony whereof I affix my signature.

THOMAS ZIMMERMAN.